UNITED STATES PATENT OFFICE 2,328,025

PROCESS FOR THE PRODUCTION OF YEAST HAVING HIGH VITAMIN B₁ POTENCY

Morris W. Mead, Jr., Bloomfield, and John Lee, Nutley, N. J., assignors, by direct and mesne assignments, of one-half to Hoffmann-La Roche, Inc., Nutley, N. J., a corporation of New Jersey, and one-half to National Grain Yeast Corp., a corporation of New Jersey No Drawing. Application February 18, 1941, Serial No. 379,532

10 Claims. (Cl. 195—82)

The present invention relates to an improved process for the fortification of yeast with vitamin $B_1$.

It is an object of the invention to provide an economical process for raising the vitamin $B_1$ potency of yeast to appreciably higher levels than are ordinarily found in yeast.

It is generally recognized among nutrition experts that a higher vitamin content in certain food products, and especially a higher vitamin $B_1$ content in white bread, is highly desirable as the present day preparations of basic food products, for example, of white flour, remove a considerable proportion of the natural vitamin $B_1$ present therein.

It is already known that yeast cells readily assimilate the thiamin (vitamin $B_1$) present in the medium in which the yeast cells are being propagated. Worts which are rich in this vitamin generally produce yeasts of higher potency than worts where natural vitamin $B_1$ is lower in content. Scientific investigations indicate that the thiamin compound is converted into a pyrophosphate derivative (cocarboxylase), in which form it naturally occurs in yeast. However, the amounts of thiamin obtainable from natural materials in this manner are far too small for practical purposes.

It has now been discovered that yeast will readily obtain thiamin from certain reaction liquors produced at an intermediate stage in the commercial preparation of crystalline thiamin and thereby substantially increase the vitamin $B_1$ potency of the yeast. These reaction liquors principally contain the O-acylated halide derivatives of thiamin. By the employment of such liquors it is possible to fortify yeast with vitamin $B_1$ in an economical manner to such an extent that bread baked therewith possesses a significantly increased vitamin $B_1$ potency. Also, if desired, the yeast which has been fortified in accordance with the present invention may be dried or dehydrated by known methods without loss of vitamin $B_1$ potency. The yeast fortified in accordance with the present invention possesses an enhanced value for various food or therapeutic uses.

The materials employed in accordance with the present invention are solutions obtained in several processes for the synthetic preparation of thiamin hydrochloride (synthetic vitamin $B_1$) and are the O-acylated derivatives of thiamin having the following general formula:

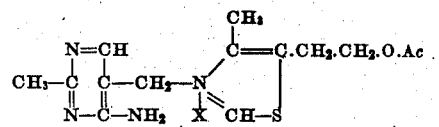

In this formula, X represents chlorine, bromine, or iodine and Ac represents acyl radicals, for example, formyl, acetyl, propionyl, or benzoyl radicals.

These thiamin derivatives may be obtained by the condensation of a suitable pyrimidine derivative with a suitable thiazole derivative or, in place of the latter, a substance which in the course of the reaction forms a thiazole nucleus. For example, the reaction liquors formed by the reaction between the following pairs of compounds have been found useful, in accordance with the present invention, in the fortification of yeast with vitamin $B_1$ potency. In the structural formulae of the compounds which are given below, X represents chlorine, bromine, or iodine and Ac represents acyl radicals, such as, formyl, acetyl, propionyl or benzoyl radicals.

(a) 2-methyl-4-amino-5-thioformylamino methyl pyrimidine and an acyloxy-3-halogeno-4-pentanone, such as, 1-acetoxy-3-bromo-4-pentanone.

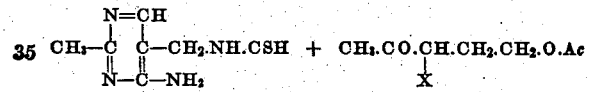

(b) A 2-methyl-4-amino-5-halogenomethyl pyrimidine and a 4-methyl-5-acyloxyethyl thiazole, as, for example, 2-methyl-4-amino-5-bromomethyl pyrimidine and 4-methyl-5-acetoxyethyl thiazole.

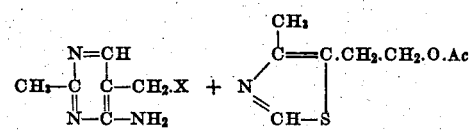

These methods of preparing the O-acylated thiamin derivatives are well known in the art.

The method employing the reactants given above in (a) is disclosed in an article by Todd and Bergel published in the Journal of the Chemical Society of London, page 364 et seq., 1937. The method employing the reactants given above in (b) is described in articles by Clive Williams and Finklestein in the Journal of the American Chemical Society, vol. 59, page 1052 et seq., 1937, and by Andersag and Westphal in Berichte der Deutschen Chemischen Gesellschaft, vol. 70, page 2035 et seq., 1937.

The fact that the vitamin $B_1$ potency of the yeast is increased to a high degree by the presence of such reaction liquors during the propagation of the yeast renders it possible to provide a more economical and efficient process for the fortification of yeast. These reaction liquors constitute intermediate products obtained in certain synthetic processes for the preparation of vitamin $B_1$ prior to the final steps involved in the recovery of the pure crystalline hydrochloride and, normally, several further chemical steps are necessary before the crystalline hydrochloride salt is obtained from these intermediate liquors; these steps including a hydrolysis for the removal of the acyl group, a conversion of the halogen salt, if not chloride, into the hydrochloride, and a final crystallization and purification of the product. In the fortification of yeast the reaction liquors may be employed directly, thus eliminating the need for carrying through these steps and effecting a saving over the cost of thiamin hydrochloride itself. The vitamin $B_1$ potency obtained by the addition to the propagating wort of a given quantity of these reaction liquors is at least comparable to that of the pure vitamin $B_1$ which could be obtained from the further chemical treatment of such quantity of liquors.

The acylated thiamin halide may be employed in formic acid or in an aqueous solution, namely, in the form of reaction liquor which may be obtained during the commercial synthesis of thiamin as a result of the above-described reactions, formic acid being preferably used as a suitable solvent in this particular step of the manufacturing process. It is, however, also possible to employ purified acylated thiamin halide, in accordance with the present invention. The reaction liquor is added to a fermenter in which yeast is being propagated by any of the usual and well-known methods. The addition thereof may be at any time during the course of fermentation, provided that a reasonable time is allowed for propagation of the yeast in the presence of the reaction liquor. Preferably, however, the reaction liquor is added about four hours before the end of the fermentation. This has been found to give ample time for the production of the desired increase in vitamin $B_1$ potency and to lessen any possibility of interference with normal yeast growth during the earlier stages of the process. However, good results have been obtained with much earlier additions. A somewhat later addition of the liquor is also feasible. The liquor may be allowed to run into the fermenter over a period of time to permit gradual mixing with the aerated wort. The impurities ordinarily present in the liquor have been found not to interfere with normal propagation of the yeast or deleteriously affect the quality of the yeast obtained. Good yields of a fast baking yeast are obtained. The vitamin $B_1$ potency of the final yeast may be adjusted to a wide range of values by the addition of the proper quantity of the reaction liquor during the preparation of the yeast. Various vitamin $B_1$ potencies ranging up to over sixty thousand international units per pound have been obtained.

The following examples will serve to illustrate specifically the manner in which the process is applied. It is to be understood, however, that the invention is not in any way limited thereto.

*Example I*

A small fermenter was set with 100 liters of dilute wort and stocked with seed yeast. Aeration and addition of the nutrient materials were carried out by known methods. Four hours before the end of the fermentation period, 9.9 cc. of a reaction liquor, obtained by condensing in formic acid solution 2-methyl-4-amino-5-thioformylamino methyl-pyrimidine with 1-acetoxy-3-bromo-4-pentanone, diluted with a small volume of water was slowly added. The yeast was harvested in the usual manner, a total of 4839 grams being recovered. The finished yeast was carefully assayed by the thiochrome method. This year was found to contain about 38,145 international units of vitamin $B_1$ per pound on a 70% moisture basis. The total thiamin content of the yeast batch was calculated as equivalent to 1,219 grams of thiamin hydrochloride. It was estimated that this amount of unfortified yeast would naturally contain 0.033 gram of thiamin, so that the actual recovery from the liquor was 1,186 grams. The reported recovery by chemical methods from 9.9 cc. of the same liquor was only 1.10 grams.

The effect in white bread of yeast fortified in a manner analogous to that described above is illustrated by the following example:

*Example II*

A sample of high vitamin $B_1$ yeast fortified during fermentation in the same manner as that described above, except that 16.3 cc. of the reaction liquor obtained by condensing 2-methyl-4-amino-5-thioformyl-amino methyl-pyrimidine with 1-acetoxy-3-bromo-4-pentanone were employed, was used for the baking of a typical white bread. This yeast contained, on a 70% moisture basis, an equivalent of over 63,000 international units of vitamin $B_1$ per pound (139 I. U./gm.). It was used in the following bread formula:

| | | |
|---|---|---:|
| Flour | grams | 250.0 |
| Water | cc. | 160.0 |
| Sugar | grams | 12.5 |
| Salt | do | 5.0 |
| Yeast | do | 8.2 |
| Shortening | do | 7.5 |
| Milk | do | 12.5 |
| Malt | do | 2.5 |
| Yeast food | do | 0.7 |

The baked bread was assayed by the thiochrome method. It was found to contain, on a 38% moisture basis, about 2.2 international units of thiamin per gram or about 1000 international units per pound. Ordinary white bread does not exceed 100 to 150 international units of thiamin per pound, measured by the thiochrome method.

While we have described herein some embodiments of our invention, we wish it to be known that we do not intend to limit ourselves thereby, except within the scope of the appended claims.

We claim:

1. In a process for producing yeast possessing high vitamin $B_1$ potency, the step comprising adding to the wort in which the yeast is being propagated, a substance of the following structure:

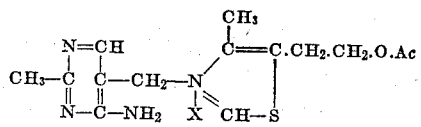

wherein X is a halide radical and Ac is an acyl radical.

2. In a process for producing yeast possessing high vitamin B₁ potency, the step comprising adding to the wort in which the yeast is being propagated about four hours before the completion of the fermentation a substance of the following structure:

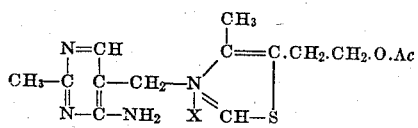

wherein X is a halide radical and Ac is an acyl radical.

3. In a process for producing yeast possessing high vitamin B₁ potency, the step comprising adding to the wort in which the yeast is being propagated the reaction liquor obtained in the preparation of a substance of the following structure:

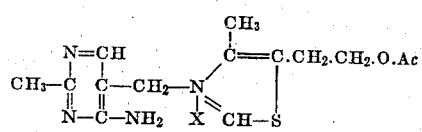

wherein X is a halide radical and Ac is an acyl radical.

4. In a process for producing yeast possessing high vitamin B₁ potency, the step comprising adding to the wort in which the yeast is being propagated the formic acid reaction liquor obtained in the preparation of a substance of the following structure:

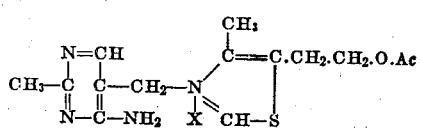

wherein X is a halide radical and Ac is an acyl radical in the presence of formic acid.

5. In a process for producing yeast possessing high vitamin B₁ potency, the step comprising adding to the wort in which the yeast is being propagated the reaction liquor obtained in the preparation of 2-methyl-5-(4-methyl-5-acetoxy-ethyl-thiazolium-bromide)-methyl-4-amino-pyrimidine.

6. In a process for producing yeast possessing high vitamin B₁ potency, the step comprising adding to the wort in which the yeast is being propagated the reaction liquor obtained in the preparation of 2-methyl-5-(4-methyl-5-acetoxy-ethyl-thiazolium-chloride)-methyl-4-amino-pyrimidine.

7. In a process for producing yeast possessing high vitamin B₁ potency, the step comprising adding to the wort in which the yeast is being propagated the reaction liquor obtained in the preparation of 2-methyl-5-(4-methyl-5-propionoxyethyl-thiazolium-bromide)-methyl-4-amino-pyrimidine.

8. In a process for producing yeast posessing high vitamin B₁ potency, the step comprising adding to the wort in which the yeast is being propagated the reaction liquor containing acylaneurin halide and obtained by condensing 2-methyl-4-amino-5-thioformyl-amino-methyl-pyrimidine and 1-acyloxy-3-halogeno-4-pentanone.

9. In a process for producing yeast possessing high vitamin B₁ potency, the step comprising adding to the wort in which the yeast is being propagated the reaction liquor containing acylaneurin halide and obtained by condensing 2-methyl-4-amino-5-thioformyl-amino-methyl-pyrimidine and 1-acetoxy-3-bromo-4-pentanone.

10. In a process for producing yeast possessing high vitamin B₁ potency, the step comprising adding to the wort in which the yeast is being propagated the compound present in the reaction liquor containing acylaneurin halide and obtained by condensing 2-methyl-4-amino-5-thioformyl-amino-methyl-pyrimidine and 1-acyloxy-3-halogeno-4-pentanone.

MORRIS W. MEAD, JR.
JOHN LEE.